United States Patent
Yoshimura et al.

(10) Patent No.: US 9,541,322 B2
(45) Date of Patent: Jan. 10, 2017

(54) VEHICLE AIR-CONDITIONING APPARATUS

(75) Inventors: Keiji Yoshimura, Chiyoda-ku (JP); Kazuhiro Horita, Chiyoda-ku (JP)

(73) Assignee: MITSUBISHI ELECTRIC CORPORATION, Chiyoda-ku, Tokyo (JP)

( * ) Notice: Subject to any disclaimer, the term of this patent is extended or adjusted under 35 U.S.C. 154(b) by 331 days.

(21) Appl. No.: 14/355,690

(22) PCT Filed: Dec. 27, 2011

(86) PCT No.: PCT/JP2011/007291
§ 371 (c)(1),
(2), (4) Date: May 1, 2014

(87) PCT Pub. No.: WO2013/098879
PCT Pub. Date: Jul. 4, 2013

(65) Prior Publication Data
US 2014/0290297 A1    Oct. 2, 2014

(51) Int. Cl.
*B60H 1/00* (2006.01)
*F25D 17/04* (2006.01)
*B61D 27/00* (2006.01)

(52) U.S. Cl.
CPC ........... *F25D 17/04* (2013.01); *B60H 1/00271* (2013.01); *B61D 27/0018* (2013.01); *B60H 2001/00307* (2013.01)

(58) Field of Classification Search
CPC ............ B60H 1/00271; B60H 2001/003; B60H 2001/00307; B61D 27/0018; F25B 31/006; F25B 31/008; F25B 49/025; F25B 49/022; F25B 2600/021; F25B 2700/021154
See application file for complete search history.

(56) References Cited

U.S. PATENT DOCUMENTS

| | | | |
|---|---|---|---|
| 4,219,071 A * | 8/1980 | Careglio | B61D 27/0027 165/202 |
| 2001/0050025 A1 | 12/2001 | Mary et al. | |
| 2011/0126568 A1* | 6/2011 | Okuda | F24F 1/24 62/259.2 |

FOREIGN PATENT DOCUMENTS

| | | |
|---|---|---|
| CN | 1412037 A | 4/2003 |
| CN | 201914253 U | 8/2011 |

(Continued)

OTHER PUBLICATIONS

Extended Search Report issued on Jul. 31, 2015, in corresponding European Patent Application No. 11878534.4 (7 pages).

(Continued)

*Primary Examiner* — Cassey D Bauer
(74) *Attorney, Agent, or Firm* — Buchanan Ingersoll & Rooney PC

(57) ABSTRACT

An outdoor unit disposed under a floor of a vehicle and including a compressor and an outdoor heat exchanger serving as a condenser during a cooling operation, an indoor unit disposed at a ceiling portion of the vehicle, including an indoor heat exchanger serving as an evaporator during the cooling operation, and connected to the outdoor unit by refrigerant pipes, and an inverter unit including a cooling heat exchanger serving as an evaporator, an air-conditioning inverter device, and a cooling air-sending device sucking outdoor air for heat exchange by the cooling heat exchanger and cooling the inverter device by cooled air obtained by the heat exchange are provided; and the cooling heat exchanger is connected in parallel to the outdoor unit by refrigerant pipes.

8 Claims, 1 Drawing Sheet

(56) References Cited

FOREIGN PATENT DOCUMENTS

| | | | |
|---|---|---|---|
| JP | 62-050268 A | 3/1987 | |
| JP | 2-310115 A | 12/1990 | |
| JP | 3-295756 A | 12/1991 | |
| JP | 4-078654 A | 3/1992 | |
| JP | 4-093557 A | 3/1992 | |
| JP | 4-189670 A | 7/1992 | |
| JP | 5-008635 A | 1/1993 | |
| JP | 2000-142393 A | 5/2000 | |
| JP | 2000-179955 A | 6/2000 | |
| JP | 2000-264046 A | 9/2000 | |
| JP | 2003-025990 A | 1/2003 | |
| JP | 4075285 B2 | 4/2008 | |
| WO | WO2010/010673 * | 1/2010 | ............ F25B 15/00 |

OTHER PUBLICATIONS

Office Action (First) issued on Sep. 30, 2015, by the Chinese Patent Office in corresponding Chinese Patent Application No. 2011800759717 and an English translation thereof. (10 pgs).

Office Action (First) issued on Sep. 30, 2015, by the Chinese Patent Office in corresponding Chinese Patent Application No. 2011800759717 and an English translation thereof.

Japanese Office Action dated Feb. 3, 2015 issued in corresponding Japanese Patent Appln. No. 2013-551027, with English translation (7 pages).

International Search Report (PCT/ISA/210) mailed on Mar 27, 2012, by the Japanese Patent Office as the International Seraching Authority for International Application No. PCT/JP2011/007291.

\* cited by examiner

VEHICLE AIR-CONDITIONING APPARATUS

TECHNICAL FIELD

The present invention relates to a split-type vehicle air-conditioning apparatus in which an outdoor unit is disposed under a floor of a railway vehicle and an indoor unit is disposed at a ceiling portion of the railway vehicle, and particularly relates to a vehicle air-conditioning apparatus having a function to cool an air-conditioning inverter device.

BACKGROUND ART

As an existing vehicle air-conditioning apparatus, there is a vehicle air-conditioning apparatus in which an indoor unit is provided on a roof of a railway vehicle, a pair of outdoor units are provided at both left and right end portions thereof, and further an inverter unit in which an inverter device is accommodated is provided between the indoor unit and one of the outdoor units. In the indoor unit, a fan motor is disposed, a pair of fans driven by the fan motor is disposed in front of and in rear of the fan motor, and a pair of indoor side heat exchangers are disposed at both outer sides of the pair of fans. During a cooling operation, cold air cooled by the pair of indoor side heat exchangers is blown into the inside of the vehicle by the fans, and part of the cold air is guided by a communication duct and discharged into the inverter unit to cool the inverter device (e.g., see Patent Literature 1).

CITATION LIST

Patent Literature

Patent Literature 1: Japanese Unexamined Patent Application Publication No. 5-8635 (Pages 2 and 3, FIG. 2)

SUMMARY OF INVENTION

Technical Problem

Meanwhile, it may be impossible to mount the inverter device at the indoor unit side depending on the vehicle air-conditioning apparatus, and the inverter device is separately disposed in this case. When the inverter device is separately disposed, it is made impossible to cool the inverter device by using a refrigeration cycle, and thus the inverter device has to be cooled by high-temperature outdoor air, and required cooling is not obtained unless the inverter device itself is increased in size.

In addition, in installing the air-conditioning apparatus to the railway vehicle, the outdoor unit and the inverter device are separately disposed in many cases. When the inverter device is mounted at the outdoor unit side, there is a problem with installation of the outdoor unit since the inverter device is large in size.

The present invention has been made in order to solve the above-described problem, and an object of the present invention is to obtain a vehicle air-conditioning apparatus which is able to cool an inverter device without increasing the size of the inverter device even when the inverter device is provided at an outdoor unit side.

Solution to Problem

A vehicle air-conditioning apparatus according to the present invention includes: an outdoor unit disposed under a floor of a vehicle and including a compressor and an outdoor heat exchanger serving as a condenser during a cooling operation; an indoor unit disposed at a ceiling portion of the vehicle, including an indoor heat exchanger serving as an evaporator during the cooling operation, and connected to the outdoor unit via a refrigerant pipe; and an inverter unit including a cooling heat exchanger serving as an evaporator, an air-conditioning inverter device, and a cooling air-sending device sucking outdoor air for heat exchange by the cooling heat exchanger and cooling the inverter device by cooled air obtained by the heat exchange. The cooling heat exchanger is connected in parallel to the outdoor unit by a refrigerant pipe.

Advantageous Effects of Invention

According to the present invention, the inverter unit including the cooling heat exchanger serving as an evaporator, the air-conditioning inverter device, and the cooling air-sending device sucking outdoor air for heat exchange by the cooling heat exchanger and cooling the inverter device by cooled air obtained by the heat exchange is provided; and the cooling heat exchanger is connected in parallel to the outdoor unit by a refrigerant pipe. Thus, it is possible to efficiently cool the inverter device, and therefore it is possible to reduce the size of the inverter device.

DESCRIPTION OF EMBODIMENTS

Embodiment 1

Figure 1:
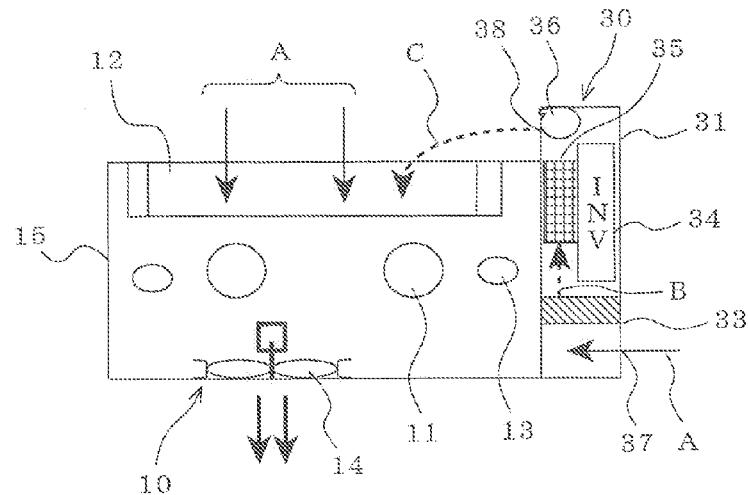
FIG. 1 is an arrangement diagram of principal components showing an outdoor unit side plane of a vehicle air-conditioning apparatus according to Embodiment 1.
Figure 2:
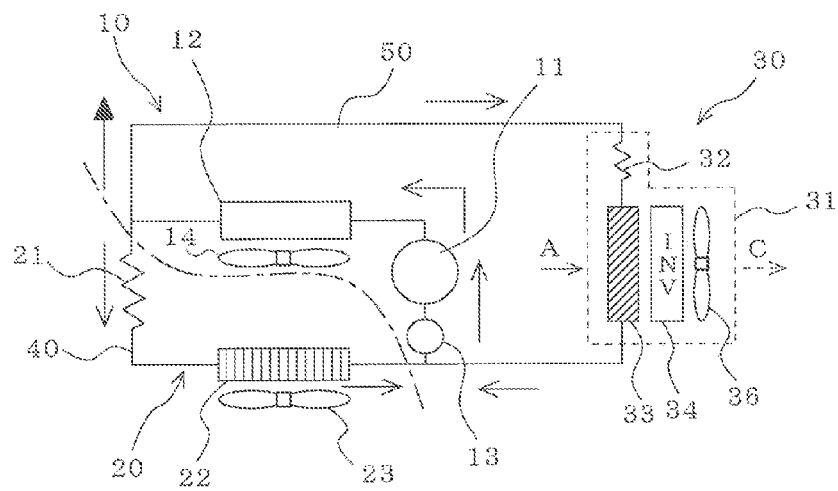
FIG. 2 is a refrigerant circuit diagram showing a schematic configuration of the vehicle air-conditioning apparatus according to Embodiment 1.

FIG. 1 is an arrangement diagram of principal components showing an outdoor unit side plane of a vehicle air-conditioning apparatus according to Embodiment 1. FIG. 2 is a refrigerant circuit diagram showing a schematic configuration of the vehicle air-conditioning apparatus according to Embodiment 1.

The vehicle air-conditioning apparatus of Embodiment 1 is a split-type air-conditioning apparatus including, for example, an outdoor unit 10 disposed under a floor of a railway vehicle and an indoor unit 20 disposed at a ceiling portion of the railway vehicle. In addition, the vehicle air-conditioning apparatus includes an inverter unit 30 (hereinafter, referred to as "INV unit 30") provided adjacently to the outdoor unit 10. It should be noted that in FIG. 2, the outdoor unit 10 and the indoor unit 20 are separated by an alternate long and short dash line.

As shown in FIG. 1, the outdoor unit 10 includes, as principal components, a compressor 11 and an accumulator 13 provided at substantially the center of the railway vehicle in the width direction thereof, an outdoor heat exchanger 12 provided at one side of the railway vehicle in the width direction thereof, and an outdoor air-sending device 14 provided at another side opposing the outdoor heat exchanger 12, and these principal components are accommodated within a casing 15. As shown in FIG. 2, the indoor unit 20 includes a capillary tube 21, an indoor heat exchanger 22, and an indoor air-sending device 23 as principal components, and these principal components are accommodated in the ceiling portion of the railway vehicle. As shown in FIG. 2, the compressor 11, the outdoor heat exchanger 12, the capillary tube 21, the indoor heat exchanger 22, and the accumulator 13, which are described above, are connected to each other by refrigerant pipes 40 to form a refrigerant circuit which cools the interior of the railway vehicle.

The INV unit 30 includes a capillary tube 32, a cooling heat exchanger 33, an air-conditioning inverter device 34, a heat sink 35 provided at the inverter device 34, and a cooling air-sending device 36 as principal components, and these principal components are accommodated within a casing 31. As shown in FIG. 1, the inverter device 34 and the heat sink 35 are provided between the cooling heat exchanger 33 and the cooling air-sending device 36. In the casing 31, a suction port 37 is provided near the cooling heat exchanger 33, and an exhaust port 38 is provided near the cooling air-sending device 36. As shown in FIG. 2, the capillary tube 32 and the cooling heat exchanger 33, which are described above, are connected in parallel to the outdoor heat exchanger 12, the compressor 11, and the accumulator 13 of the outdoor unit 10 by refrigerant pipes 50.

In the vehicle air-conditioning apparatus configured as described above, when a high-temperature and high-pressure gas refrigerant is discharged from the compressor 11, the high-temperature and high-pressure gas refrigerant flows into the outdoor heat exchanger 12, and is subjected to heat exchange (heat transfer) with outdoor air sent from the outdoor air-sending device 14, to be a low-temperature and high-pressure liquid refrigerant. Then, the low-temperature and high-pressure liquid refrigerant flows into the refrigerant pipe 50 at the INV unit 30 side and also flows into the refrigerant pipe 40 at the indoor unit 20 side.

The low-temperature and high-pressure liquid refrigerant having flowed into the refrigerant pipe 40 flows into the capillary tube 21, becomes a low-temperature and low-pressure liquid refrigerant, and flows into the indoor heat exchanger 22. The low-temperature and low-pressure liquid refrigerant having flowed into the indoor heat exchanger 22 is subjected to heat exchange with air circulating in the vehicle interior by the indoor air-sending device 23, to be a low-temperature and low-pressure gas refrigerant. Then, the low-temperature and low-pressure gas refrigerant is sucked into the compressor 11 via the accumulator 13.

In addition, the low-temperature and high-pressure liquid refrigerant having flowed into the refrigerant pipe 50 at the INV unit 30 side flows into the capillary tube 32, becomes a low-temperature and low-pressure liquid refrigerant, and flows into the cooling heat exchanger 33. The low-temperature and low-pressure liquid refrigerant having flowed into the cooling heat exchanger 33 is subjected to heat exchange with outdoor air A introduced through the suction port 37 into the casing 31 by the cooling air-sending device 36, to be a low-temperature and low-pressure gas refrigerant. Then, the low-temperature and low-pressure gas refrigerant is sucked into the compressor 11 via the accumulator 13 similarly to the above.

Meanwhile, the outdoor air A introduced into the casing 31 becomes cooled air B by heat exchange by the cooling heat exchanger 33 and flows to the cooling air-sending device 36 side. At that time, the cooled air B removes heat from the heat sink 35 to cool the inverter device 34, and becomes cooled air C having an increased temperature. The cooled air C is discharged through the exhaust port 38 by the cooling air-sending device 36. For example, the cooled air C is sent to the outdoor heat exchanger 12 through a duct (not shown) which is an air passage provided between the exhaust port 38 and the outdoor air suction side of the outdoor heat exchanger 12. This is for mixing the cooled air C having a lower temperature than the outdoor air A with the outdoor air A sucked by the outdoor air-sending device 14 and collecting the heat of the outdoor air A flowing through the outdoor heat exchanger 12. This heat collection improves the efficiency of heat exchange with the outdoor air A in the outdoor heat exchanger 12.

As described above, in Embodiment 1, the INV unit 30 including the capillary tube 32 and the cooling heat exchanger 33 is connected in parallel to the outdoor unit 10 which, together with the indoor unit 20, forms the refrigerant circuit, and the inverter device 34 within the INV unit 30 is cooled via the heat sink 35 by the cooled air B resulting from the heat exchange of the outdoor air A by the cooling heat exchanger 33. Thus, it is possible to efficiently cool the inverter device 34, and it is possible to reduce the size of the inverter device 34.

It should be noted that in Embodiment 1, it is described that the inverter device 34 is cooled via the heat sink 35 by the cooled air B resulting from the heat exchange of the outdoor air by the cooling heat exchanger 33, but the cooled air B resulting from the heat exchange of the outdoor air A by the cooling heat exchanger 33 may be sent directly to the inverter device 34 to cool the inverter device 34. In this case, the heat sink 35 is unnecessary. Thus, it is possible to reduce the size of the INV unit 30 itself as compared to Embodiment 1, and it is possible to reduce the cost.

In addition, in Embodiment 1, the outdoor air is used to cool the inverter device 34, but indoor air discharged to the outside for ventilation of the interior of the railway vehicle may be introduced as outdoor air into the INV unit 30 via a duct which is an air passage and may be subjected to heat exchange by the cooling heat exchanger 33 to be used to cool the inverter device 34. In the case of such a configuration, the effect of cooling the inverter device 34 is further enhanced, and the temperature of the cooled air C sent from the INV unit 30 to the outdoor unit 10 is low as compared to the case of using the outdoor air for cooling. Thus, the efficiency of heat exchange with the outdoor air A in the outdoor heat exchanger 12 is improved.

Embodiment 2

Figure 3:
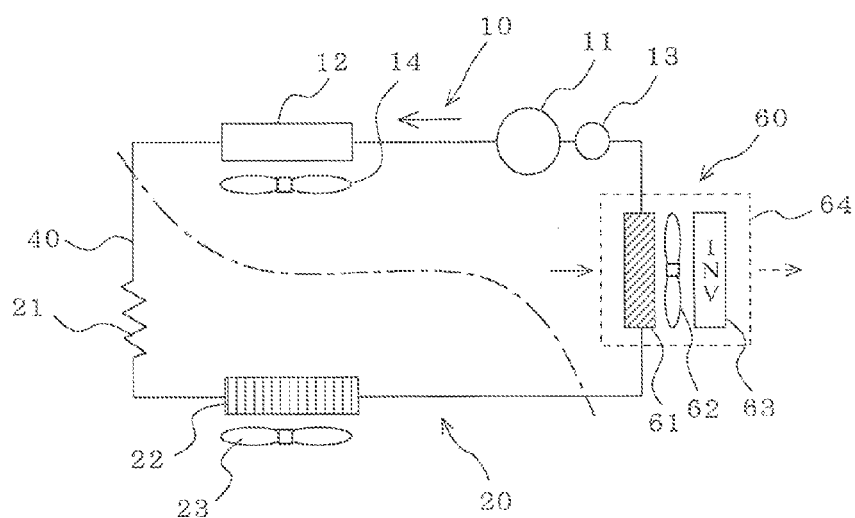
FIG. 3 is a refrigerant circuit diagram showing a schematic configuration of a vehicle air-conditioning apparatus according to Embodiment 2.

FIG. 3 is a refrigerant circuit diagram showing a schematic configuration of a vehicle air-conditioning apparatus according to Embodiment 2. It should be noted that in the embodiment, parts that are the same as those in Embodiment 1 are designated by the same reference sings.

Similarly to Embodiment 1, the vehicle air-conditioning apparatus of Embodiment 2 is a split-type air-conditioning apparatus including an outdoor unit 10 disposed under a floor of a railway vehicle and an indoor unit 20 disposed at a ceiling portion of the railway vehicle. In addition, the vehicle air-conditioning apparatus includes an inverter unit 60 (hereinafter, referred to as "INV unit 60") provided adjacently to the outdoor unit 10. It should be noted that in FIG. 3, the outdoor unit 10 and the indoor unit 20 are separated by an alternate long and short dash line.

As shown in FIG. 3, the outdoor unit 10 includes a compressor 11, an outdoor heat exchanger 12, an accumulator 13, and an outdoor air-sending device 14 as principal components, and these principal components are accommodated within a casing (not shown). The indoor unit 20 includes a capillary tube 21, an indoor heat exchanger 22, and an indoor air-sending device 23 as principal components, and these principal components are accommodated in the ceiling portion of the railway vehicle.

The INV unit 60 includes a cooling heat exchanger 61, a cooling air-sending device 62, and an air-conditioning inverter device 63 as principal components, and these principal components are accommodated within a casing 64 provided adjacently to the outdoor unit 10. For example, as shown in FIG. 3, the inverter device 63 of the INV unit 60 is provided at the downstream side in the direction of flow of outdoor air introduced into the casing by the cooling air-sending device 62.

The compressor 11, the outdoor heat exchanger 12, the capillary tube 21, the indoor heat exchanger 22, the cooling heat exchanger 61, and the accumulator 13, which are described above, are connected to each other by refrigerant pipes 40. By this connection, a refrigerant circuit is formed which cools the interior of the railway vehicle and cools the inverter device 63.

In the vehicle air-conditioning apparatus configured as described above, when a high-temperature and high-pressure gas refrigerant is discharged from the compressor 11, the high-temperature and high-pressure gas refrigerant flows into the outdoor heat exchanger 12, and is subjected to heat exchange (heat transfer) with outdoor air sent from the outdoor air-sending device 14, to be a low-temperature and high-pressure liquid refrigerant. Then, the low-temperature and high-pressure liquid refrigerant flows into the capillary tube 21, becomes a low-temperature and low-pressure liquid refrigerant, and flows into the indoor heat exchanger 22. The low-temperature and low-pressure liquid refrigerant having flowed into the indoor heat exchanger 22 is subjected to heat exchange with air circulating in the vehicle interior by the indoor air-sending device 23, to be a low-temperature and low-pressure gas refrigerant.

The low-temperature and low-pressure gas refrigerant having flowed out from the indoor heat exchanger 22 flows into the cooling heat exchanger 61, is subjected to heat exchange therein with outdoor air introduced into the casing by the cooling air-sending device 62, and is sucked into the compressor 11 via the accumulator 13. At that time, the outdoor air introduced into the casing becomes cooled air by heat exchange by the cooling heat exchanger 61, and cools the inverter device 63. Although depending on the temperature of the outdoor air, the cooled air has generally a temperature of 30 degrees C. to 35 degrees C. which allows cooling of the inverter device 63.

As described above, in Embodiment 2, of the refrigerant pipes 40 connecting the outdoor unit 10 and the indoor unit 20, the INV unit 60 is inserted on the refrigerant pipe 40 through which the returning refrigerant is introduced from the indoor unit 20 to the outdoor unit 10 during a cooling operation, and the inverter device 63 within the INV unit 60 is cooled by the cooled air resulting from the heat exchange of the outdoor air by the cooling heat exchanger 61. Thus, it is possible to efficiently cool the inverter device 63, and it is possible to reduce the size of the inverter device 63.

It should be noted that in Embodiment 2, it is described that the inverter device 63 is provided at the downstream side of flow of the outdoor air introduced into the casing by the cooling air-sending device 62, but the present invention is not limited to this. For example, the inverter device 63 may be provided between the cooling heat exchanger 61 and the cooling air-sending device 62.

In addition, in Embodiment 2, it is described that the inverter device 63 is cooled directly by the cooled air resulting from the heat exchange of the outdoor air by the cooling heat exchanger 61, but, similarly to Embodiment 1, a heat sink 35 may be provided at the inverter device 63 and may be cooled by the cooled air to lower the temperature of the inverter device 63.

Moreover, in Embodiment 2, only the inverter device 63 is cooled by the cooled air resulting from the heat exchange of the outdoor air by the cooling heat exchanger 61, however, similarly to Embodiment 1, the cooled air having cooled the inverter device 63 may be sent to the outdoor heat exchanger 12 of the outdoor unit 10 via a duct.

Furthermore, in Embodiment 2, the outdoor air is used to cool the inverter device 63, but indoor air discharged to the outside for ventilation of the interior of the railway vehicle may be introduced as outdoor air into the INV unit 60 via a duct which is an air passage and may be subjected to heat exchange by the cooling heat exchanger 61 to be used to cool the inverter device 63. Thus, the effect of cooling the inverter device 63 is further enhanced.

REFERENCE SIGNS LIST

10 outdoor unit 11 compressor 12 outdoor heat exchanger 13 accumulator 14 outdoor air-sending device 15 casing 20 indoor unit 21 capillary tube 22 indoor heat exchanger 23 indoor air-sending device 30, 60 inverter unit 31, 64 casing 32 capillary tube 33, 61 cooling heat exchanger 34, 63 inverter device 35 heat sink 36, 62 cooling air-sending device 37 suction port 38 exhaust port 40, 50 refrigerant pipe

The invention claimed is:

1. A vehicle air-conditioning apparatus comprising:
   an outdoor unit disposed under a floor of a vehicle and including a compressor and an outdoor heat exchanger serving as a condenser during a cooling operation;
   an indoor unit disposed at a ceiling portion of the vehicle, including an indoor heat exchanger serving as an evaporator during the cooling operation, and connected to the outdoor unit via a refrigerant pipe; and
   an inverter unit including a cooling heat exchanger serving as an evaporator, an air-conditioning inverter device, and a cooling air-sending device for sucking outdoor air for heat exchange by the cooling heat exchanger and cooling the inverter device by cooled air obtained by the heat exchange, wherein
   the cooling heat exchanger and the indoor heat exchanger being connected in parallel to the outdoor unit by a refrigerant pipe.

2. A vehicle air-conditioning apparatus comprising:
   an outdoor unit disposed under a floor of a vehicle and including a compressor and an outdoor heat exchanger serving as a condenser during a cooling operation;
   an indoor unit disposed at a ceiling portion of the vehicle, including an indoor heat exchanger serving as an evaporator during the cooling operation, and connected to the outdoor unit via a refrigerant pipe; and
   an inverter unit including a cooling heat exchanger serving as an evaporator, an air-conditioning inverter device, and a cooling air-sending device sucking outdoor air for heat exchange by the cooling heat exchanger and cooling the inverter device by cooled air obtained by the heat exchange, wherein
   the cooling heat exchanger is disposed at a portion of the refrigerant pipe through which a returning refrigerant is introduced from the indoor unit to the outdoor unit during the cooling operation.

3. The vehicle air-conditioning apparatus of claim 1, wherein the inverter unit includes a heat sink for releasing heat generated from the inverter device, and the inverter device is cooled via the heat sink by the cooled air.

4. The vehicle air-conditioning apparatus of claim 1, further comprising
an air passage introducing the cooled air having cooled the inverter device, to an outdoor air suction side of the outdoor heat exchanger of the outdoor unit.

5. The vehicle air-conditioning apparatus of claim 1, further comprising
an air passage introducing indoor air discharged to an outside for ventilation of an interior of the vehicle, as outdoor air into the inverter unit.

6. The vehicle air-conditioning apparatus of claim 2, wherein the inverter unit includes a heat sink for releasing heat generated from the inverter device, and the inverter device is cooled via the heat sink by the cooled air.

7. The vehicle air-conditioning apparatus of claim 2, further comprising
an air passage introducing the cooled air having cooled the inverter device, to an outdoor air suction side of the outdoor heat exchanger of the outdoor unit.

8. The vehicle air-conditioning apparatus of claim 2, further comprising
an air passage introducing indoor air discharged to an outside for ventilation of an interior of the vehicle, as outdoor air into the inverter unit.

* * * * *